(12) United States Patent
Pritchard et al.

(10) Patent No.: US 10,057,231 B2
(45) Date of Patent: Aug. 21, 2018

(54) CALIBRATING PROXIMITY DETECTION FOR A WEARABLE PROCESSING DEVICE

(71) Applicant: ARM IP LIMITED, Cambridge (GB)

(72) Inventors: Andrew Pritchard, Cambridge (GB); James Crosby, Cambridge (GB); Hugo John Martin Vincent, Cambridge (GB)

(73) Assignee: ARM IP Limited, Cambridge (GB)

( * ) Notice: Subject to any disclaimer, the term of this patent is extended or adjusted under 35 U.S.C. 154(b) by 65 days.

(21) Appl. No.: 15/034,540

(22) PCT Filed: Nov. 5, 2014

(86) PCT No.: PCT/GB2014/053295
§ 371 (c)(1),
(2) Date: May 4, 2016

(87) PCT Pub. No.: WO2015/067942
PCT Pub. Date: May 14, 2015

(65) Prior Publication Data
US 2016/0255068 A1    Sep. 1, 2016

(30) Foreign Application Priority Data

Nov. 6, 2013    (GB) .................................. 1319590.4

(51) Int. Cl.
*G06F 21/00* (2013.01)
*H04L 29/06* (2006.01)
(Continued)

(52) U.S. Cl.
CPC .............. *H04L 63/08* (2013.01); *G06F 21/35* (2013.01); *H04L 63/102* (2013.01); *H04W 4/02* (2013.01); *H04W 4/025* (2013.01); *H04W 88/023* (2013.01)

(58) Field of Classification Search
None
See application file for complete search history.

(56) References Cited

U.S. PATENT DOCUMENTS 8,775,103 B1 *  7/2014  Jayaraj ................. H03K 17/955
                                                        702/57
9,091,715 B2 *  7/2015  Alameh ............... H03K 17/955
                        (Continued)

FOREIGN PATENT DOCUMENTS

WO    WO 2007/107749 A1    9/2007

OTHER PUBLICATIONS

PCT International Preliminary Report on Patentability for PCT/GB2014/053295, dated May 19, 2016, 8 pages.
(Continued)

*Primary Examiner* — Farid Homayounmehr
*Assistant Examiner* — Olanrewaju J. Bucknor
(74) *Attorney, Agent, or Firm* — Patterson Thuente Pedersen, P.A.

(57) ABSTRACT

Proximity of a wearable processing device to a data processing apparatus is detected based on wireless signals received by the data processing apparatus from the wearable processing device. A user input operation is detected which comprises a physical interaction with the data processing apparatus. In response to detecting the user input operation, at least one detection parameter is calibrated for the proximity detection. This provides a convenient technique for calibrating the proximity detection which does not require complicated operations from the user.

16 Claims, 6 Drawing Sheets

(51) Int. Cl.
  *G06F 21/35* (2013.01)
  *H04W 4/02* (2018.01)
  *H04W 88/02* (2009.01)

(56) References Cited

U.S. PATENT DOCUMENTS

| | | | | |
|---|---|---|---|---|
| 2010/0112964 | A1* | 5/2010 | Yi | G04G 9/0064 |
| | | | | 455/90.3 |
| 2010/0120406 | A1 | 5/2010 | Banga et al. | |
| 2010/0124949 | A1* | 5/2010 | Demuynck | G06F 1/1626 |
| | | | | 455/569.1 |
| 2010/0164479 | A1* | 7/2010 | Alameh | G01D 18/006 |
| | | | | 324/115 |
| 2012/0206296 | A1* | 8/2012 | Wan | A01K 11/008 |
| | | | | 342/357.31 |
| 2013/0229930 | A1 | 9/2013 | Akay et al. | |
| 2014/0073262 | A1* | 3/2014 | Gutierrez | G08B 13/22 |
| | | | | 455/67.11 |
| 2014/0143785 | A1* | 5/2014 | Mistry | G06F 1/163 |
| | | | | 718/104 |
| 2014/0160055 | A1* | 6/2014 | Margolis | G06F 1/163 |
| | | | | 345/174 |
| 2014/0218173 | A1* | 8/2014 | Long | G06K 17/00 |
| | | | | 340/10.1 |
| 2015/0039880 | A1* | 2/2015 | Aminzade | H04L 41/0816 |
| | | | | 713/100 |
| 2015/0062022 | A1* | 3/2015 | Rabii | G06T 1/20 |
| | | | | 345/173 |
| 2016/0277891 | A1* | 9/2016 | Dvortsov | H04W 4/008 |

OTHER PUBLICATIONS

International Search Report for PCT/GB2014/053295, dated Jan. 27, 2015, 3 pages.
Written Opinion for PCT/GB2014/053295, dated Jan. 27, 2015, 6 pages.

* cited by examiner

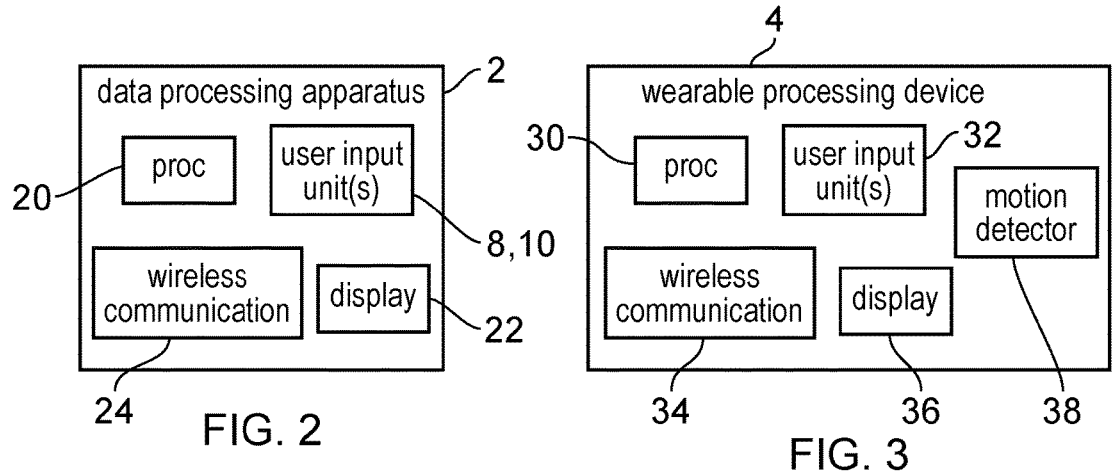
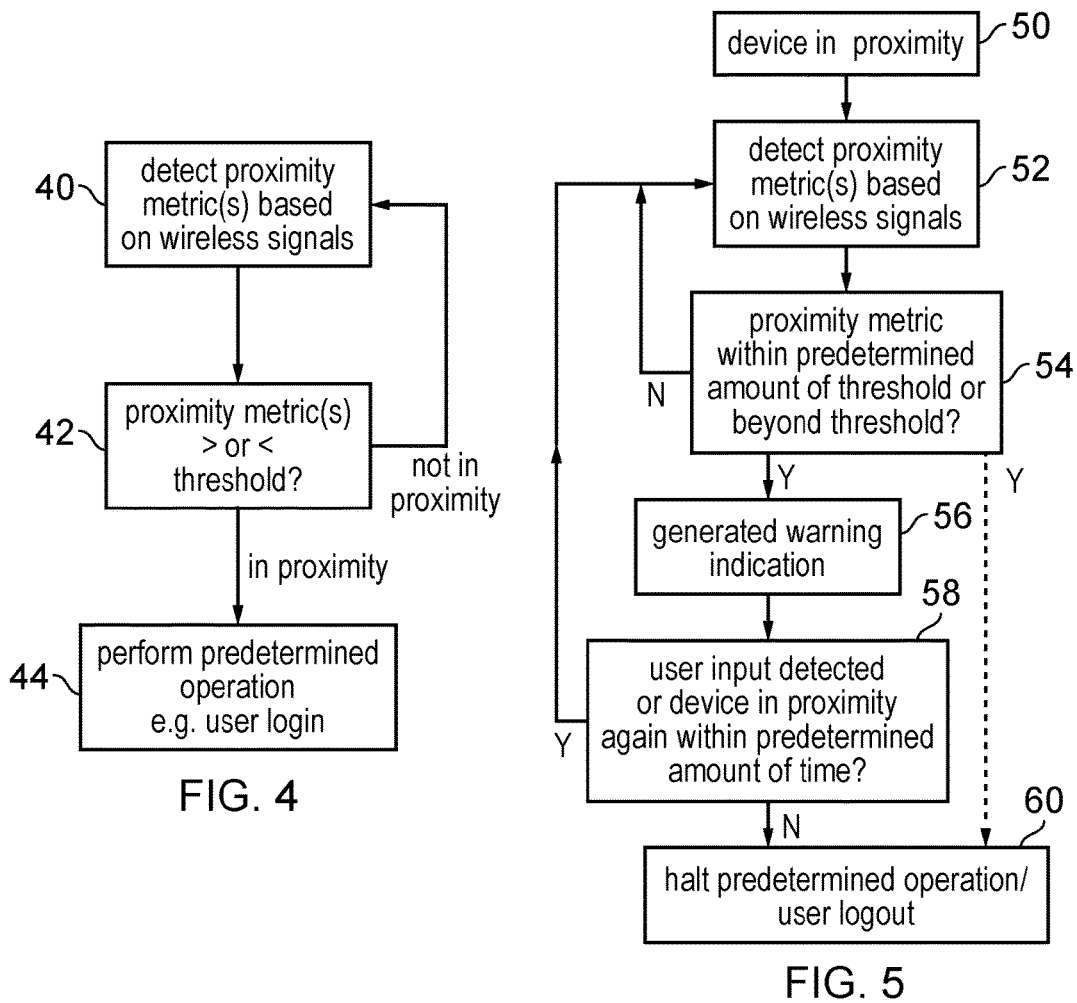

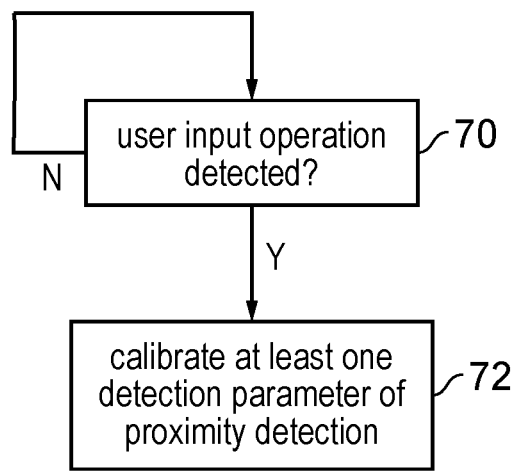
FIG. 6
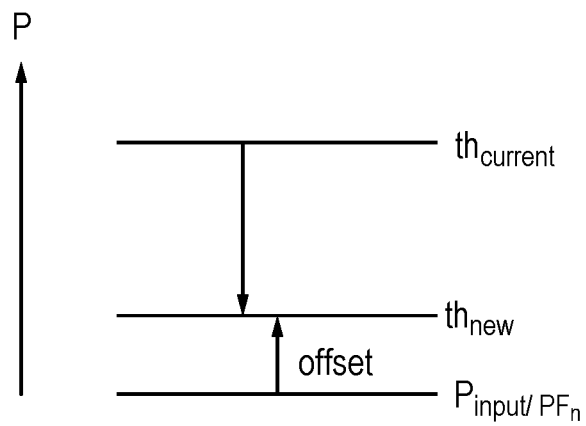
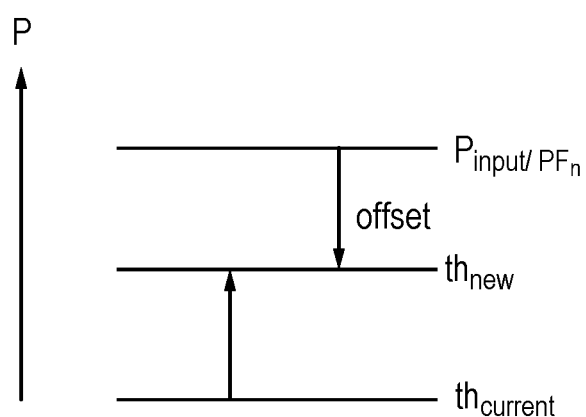
FIG. 7

CALIBRATING PROXIMITY DETECTION FOR A WEARABLE PROCESSING DEVICE

RELATED APPLICATIONS

The present application is a National Phase entry of PCT Application No. PCT/GB2014/053295, filed Nov. 5, 2014, which claims priority from GB Patent Application No. 1319590.4, filed Nov. 6, 2013, said applications being hereby incorporated by reference herein in their entirety.

TECHNICAL FIELD

The present invention relates to the field of data processing devices. More particularly, the invention relates to calibrating proximity detection of a wearable processing device.

BACKGROUND ART

Recently interest has been growing in wearable processing devices, such as a smart watch, bracelet, necklace, item of clothing or pair of glasses. The wearable processing device may be worn in the same way as a regular item of clothing or accessory, but may be provided with some processing capability to allow the device to carry out various functions, such as GPS monitoring or email mailbox functions for example.

One potential use for a wearable processing device is to trigger a function on another data processing apparatus when the wearable processing device is detected to be in proximity to the other processing apparatus. The proximity detection may be based on wireless signals exchanged by the wearable processing device and data processing apparatus. However, different wearable processing devices may have different characteristics affecting the wireless signals and so typically some calibration is required to control the point at which the wearable processing device is detected to be in proximity to the processing apparatus. The present technique seeks to improve the calibration of such proximity detection.

Viewed from a first aspect, the present invention provides a method comprising steps of:

detecting proximity of a wearable processing device to a data processing apparatus based on wireless signals received by the data processing apparatus from the wearable processing device;

detecting a user input operation comprising a physical interaction with the data processing apparatus for controlling the data processing apparatus; and in response to detecting the user input operation, calibrating at least one detection parameter for the proximity detecting step.

To calibrate the proximity detection of a wearable processing device based on wireless signals received by a data processing apparatus from the wearable processing device, one might expect that it would be necessary to instruct the user to place the wearable processing device a predetermined distance away from the data processing apparatus, and to then calibrate the proximity detection based on a property of the wireless signals measured when the wearable processing device is at the predetermined location. However, it can be frustrating for the user to have to stop what they are doing in order to place the wearable processing device at the predetermined location for such a calibration operation, especially if the calibration needs to be performed relatively often.

SUMMARY OF THE INVENTION

In contrast, the present technique recognizes that reliable proximity cues can be gained when the data processing apparatus detects a user input operation which comprises a physical interaction with the data processing apparatus. For example, the user input operation may be the user using a track pad on a laptop or a keyboard, mouse or other peripheral of the data processing apparatus for example. When the user input operation is detected, then the wearable processing device may be assumed to be in proximity to the data processing apparatus, since the user performing the user input operation may be assumed to be wearing the wearable processing device. Hence, calibration of at least one detection parameter for the proximity detection can be performed in response to detecting the user input operation. This allows the calibration to be performed in an unobtrusive way, since the user does not need to be prompted to perform special calibration operations and need not even be aware that the calibration is taking place. Therefore, the present technique may be more convenient for the user of these devices.

The data processing apparatus may be any electronic device or computer having the capability of receiving wireless signals. For example, the data processing apparatus may be a desktop computer, laptop, tablet computer, mobile telephone, smartphone, or another electronic device such as a smart television or digital camera. In response to detecting proximity of the wearable processing device to the data processing apparatus, the data processing apparatus may perform at least one predetermined operation. For example, the data processing apparatus may exchange data with the wearable processing device, or the data processing apparatus may start software associated with the wearable processing device when the wearable processing device is detected to be in proximity.

A particularly useful example is where the data processing apparatus performs authentication of a user in response to detecting proximity of the wearable device. For example, the authentication may comprise a user login operation for logging the user of the wearable processing device into the data processing apparatus itself, a program executed by the data processing apparatus, or a website being accessed by the data processing apparatus. Hence, the user of the wearable processing device can be automatically logged into the system, program or website without needing to manually input login information such as a username and password. Once the user has authenticated themselves with the wearable processing device, then the wearable processing device may act as a proxy for the user to represent the trusted identity of the user.

Different wearable processing devices may have different values for the detection parameter for proximity detection. Some devices may for example have stronger wireless transmitters than others, or the particular body shape of the user or location on which the device is worn on the body may affect the attenuation of wireless signals from the device. Therefore, the calibration may be performed separately for each wearable processing device. While it may be possible for the user to input some kind of identifier identifying the wearable processing device for which calibration is to be performed, this may be inconvenient for the user. One way of automatically detecting which device should be calibrated is to detect proximity of a wearable processing device and then, when a user input operation is detected by the data processing apparatus, to perform calibration for the device whose proximity has already been detected. In the case where the user is automatically authenticated when proximity is detected, then the calibrating step may calibrate the detection parameter for a wearable processing device whose user is currently logged in.

After a user has already been authenticated when proximity of the wearable processing device is detected, the user may then be deauthenticated if it is detected that the wearable processing device is no longer in proximity to the processing apparatus. For example, the user may be logged out of the system, program or website for which authentication was required. Alternatively, if proximity is no longer detected, then a deauthentication warning indication may be generated by at least one of the data processing apparatus and the wearable processing device. For example, the warning indication could be a message displayed on the wearable processing device or the data processing apparatus, an audible warning, a vibrating buzzer on the wearable processing device or some other kind of touch based indication that signals to the user that they will be deauthenticated soon if they do not return to proximity to the data processing apparatus. If, after a predetermined amount of time has elapsed following the logout warning indication, the wearable processing device is detected to still not be in proximity to the data processing apparatus, then the user may be deauthenticated (logged out).

The deauthentication of the user may be deferred or inhibited if the user input operation is detected. Hence, even if the wireless signals appear to indicate that the device is no longer in proximity, if a user input operation is detected at the data processing apparatus then it can be assumed that the user is still present and in this case the lack of proximity detected from the wireless signals may be considered to be unreliable. Therefore, the logout can be deferred or inhibited altogether.

The proximity of the wearable processing device may be detected based on a proximity metric determined based on the wireless signals received by the data processing apparatus from the wearable processing device. The proximity metric may be any property of the wireless signals which depends on a distance of the wearable processing device from the wireless received of the data processing apparatus. For example, the proximity metric may be a signal strength metric which depends on the received signal strength of the wireless signals. For example, a receive signal strength indicator (RSSI) may be used. Many wireless receiving circuits, such as a Bluetooth receiver or wireless local area network (e.g. Wi-Fi) receiver, already measure the RSSI and so it is convenient to use the RSSI as the proximity metric. Another example of the proximity metric may be a message trip time representing the time taken for a message to travel between the wearable processing device and the data processing apparatus. For example, the message trip time may comprise a one way trip time representing the time between a message being transmitted by one of the devices and the message being received at the other device. Also, the message trip time can comprise a round trip time which can be measured by transmitting a message from the data processing apparatus to the wearable processing device which then triggers a response from the wearable processing device to the data processing apparatus, and measuring the time between transmitting the message and receiving the response. The longer the message trip time, the further away the wearable processing device is.

The proximity detection may detect proximity of the wearable processing device based on whether the proximity metric exceeds a proximity detection threshold. For some proximity metrics, such as the signal strength metric, proximity may be detected if the proximity metric is greater than the proximity detection threshold. For other proximity metrics, such as the message trip time, proximity may be detected if the proximity metric is less than the proximity detection threshold. In some embodiments, a dynamically computed value for the proximity detection threshold may be used, whose value depends on current operating conditions or other factors, such as the present time, or what type of user input operation has been detected, for instance. Hence, it is not essential for the same threshold value to be used on each occasion that proximity is detected.

At least one of the data processing apparatus and the wearable processing device may generate a proximity indication indicating to the user whether proximity of the wearable processing device to the data processing apparatus is detected. For example, an icon can be displayed on the wearable processing device or the data processing apparatus to indicate that proximity has been detected, or to indicate a relative degree of proximity detection such as a percentage or confidence value. Alternatively, the indication may be an audible indication or a touch based indication such as a vibration. This allows the user to determine at what point proximity is detected and so helps the user to understand better how to use the wearable processing device to interact with the data processing apparatus.

A warning indication may also be generated with at least one of the data processing apparatus and the wearable processing device in response to detecting that the difference between the proximity metric and the proximity detection threshold is less than a predetermined amount. This warning indication can signify to the user that they are near the limit of proximity detection and that if they move any further away from the data processing apparatus then the wearable processing device will no longer be detected to be in proximity. This can be particularly useful to warn the user if they are going to be logged out or deauthenticated if they move any further away from the data processing apparatus.

While the calibration may modify any parameter of the proximity detection, a particularly useful example is where the at least one detection parameter which is modified in the calibration comprises the proximity detection threshold. For example, when the user input operation is detected then the data processing apparatus may monitor the wireless signals and measure a current value of the proximity metric at the time of detecting the user input operation. The data processing apparatus may then adjust the threshold so that it is given a new value which is closer to the current measured value of the proximity metric than a previous value of the threshold. For example, the threshold may be adjusted to a new value which is offset from the current measured value of the proximity metric by a given offset. The offset may be determined as a function of at least one of the current threshold value, the current measured value of the proximity metric, a filtered version of the current measured value, and other parameters. In this way, the threshold can be shifted to a value which will trigger the transition from lack of proximity to proximity when the user is near enough to the data processing apparatus to perform the user input operation, which will generally be when the user wishes proximity to be detected. In embodiments having dynamically selected threshold values as discussed above, the threshold value corresponding to the current conditions may be calibrated in response to the user input operation while other threshold values which do not correspond to current conditions may remain the same.

Where a signal strength metric is used as the proximity metric, the signal strength metric may be based on average signal strength detected over a period of time. There may be variation of the signal strength detected over time, for example due to the user moving while using the data processing apparatus and attenuating the wireless signals. An average signal strength detected over a certain period of time such as a few seconds may be more reliable as an indicator of the proximity of the wearable device than the absolute value of signal strength at a given instant. Also, there may be some filtering of measured values of the signal strength of the wireless signals in order to obtain the signal strength metric. For example, filtering may be performed to filter out high frequency variation in the measured values of the measured signal strength. A low pass filter or a slow filter with long time constant may be used for this. This will tend to smooth out the measured signal strength providing a more reliable indication of proximity. Also, filtering may be performed to filter out anomalous values of the measured values of the signal strength. For example, if an unusually high or low signal strength is detected then it may be assumed that this is not due to the proximity of the wearable processing device and so such values can be ignored. For example, a high signal strength detection may be indicative of the fact that a very strong transmitter of wireless signals is nearby, which could be due to an attacker trying to simulate the presence of the wearable processing device using a nearby antenna. By filtering out anomalous values then such attacks can be discouraged or prevented.

As well as the data processing apparatus detecting proximity of the wearable processing device, the wearable processing device may also detect proximity of the data processing apparatus to the wearable processing device based on wireless signals received by the wearable processing device from the data processing apparatus. For example, the data processing apparatus may detect a first proximity metric based on wireless signals received by the data processing apparatus from the wearable processing device, and the wearable processing device may detect a second proximity metric based on wireless signals received by the wearable processing device from the data processing apparatus. The overall proximity detection may then be based on both the first and second proximity metrics so that a more reliable indication of proximity can be determined. Hence, if one of the devices detects proximity of the other device but the other device does not detect proximity of the first device, then a lower confidence in the proximity detection may be determined than if both devices detect proximity of the other device. This can improve the accuracy of proximity detection.

The proximity detection by the wearable processing device may also need to be calibrated. While it may be possible for the calibration of the proximity detection at the wearable processing device to be independent of the calibration performed by the data processing apparatus, often it may be convenient to perform both calibrations at the same time. Hence, when the user input operation is detected, then the data processing apparatus may instruct the wearable processing device to perform calibration of at least one detection parameter for its proximity detection. The calibration for the wearable processing device may be performed in a similar way to the calibration for the data processing apparatus discussed in detail herein.

The wireless signals received from the wearable processing device need not be the only information used to detect proximity of the wearable processing device. For example, motion information indicative of motion of the wearable processing device may be considered. For example, the wearable processing device may have a motion detector such as an accelerometer, magnetometer or gyroscope for detecting the motion information. Considering motion information may improve the accuracy of proximity detection based on wireless signals. For example, when proximity of the wearable processing device has previously been detected, and then the wireless signals monitored by the data processing apparatus appear to indicate that the device is moving further away from the data processing apparatus, the data processing apparatus may also check motion information received from the wearable processing device to check whether the motion information is consistent with the change in the wireless signals. If the motion information confirms that there is motion of the wearable processing device, then the confidence in the change in proximity may be higher than if the motion information appears to indicate that the device is not moving.

As well as the calibration performed when the user input operation is detected, there may be other forms of calibration. For example, different wearable devices may have different transmission powers so that different signal strengths may be detected when the wearable devices are at the same distance away from the wireless receiver. Therefore, a transmission power offset for the wearable processing device may be determined and a step of calibrating the at least one detection parameter or a further detection parameter (not necessarily the same detection parameter which is calibrated in response to the user operation) for the proximity detection step may be performed based on the transmission power offset. The determination of the transmission power offset may include actually measuring the offset when a device is a fixed distance away, or alternatively the transmission power offset may be measured when the device is manufactured and stored in the wearable processing device, and then the data processing apparatus may simply read the transmission power offset from the wearable processing device. Later, when detecting proximity of the wearable processing device, the measured signal strength may be offset based on the previously determined transmission power offset. Hence, this type of calibration may be performed once for each device, not repeatedly when user input operations are detected. Similarly, there may be a reception power offset associated with the wireless receiver at the data processing apparatus and so this reception power offset may also be calibrated and accounted for when detecting proximity.

The proximity detection may also comprise detecting whether a signal strength metric is constant for more than a given time period. If the signal strength metric is determined to be constant for greater than the predetermined time period, then either the wearable processing device may be detected to not be in proximity to the data processing apparatus, or a warning message may be sent to the wearable processing device and if no response is received within a given time then the wearable processing device may be determined not to be in proximity. This is because there are some forms of wireless receivers whose signal strength indicator measurement is configured such that if the source of wireless signals is suddenly removed, then the measured signal strength metric will continue to be recorded with the same value for a certain period despite the absence of the source of the wireless signals. For example, Bluetooth receivers operate in this way so that for a time a constant RSSI value is read from a cache rather than being a true indicator of the signal strength of received wireless signals. While the absolute values of the signal strength metric may be appear to indicate that the devices are still in proximity, it can usually be assumed that the signal strength metric detected for a real device will exhibit some variation over time, for example due to motion of the user. Therefore, if the signal strength metric is determined to be constant for greater than a given time period then this can be assumed to be due to the continued reporting of the same value of the RSSI following removal of the wearable processing device, rather than because the wearable processing device is still present.

The user input operation which triggers a calibration may comprise any physical interaction with a user input unit of the data processing apparatus (including peripherals) which indicates that the user is close to the data processing apparatus. For example, the user input unit may be a touch pad (also known as track pad) which is often used to control the mouse cursor in a laptop, a mouse, a pointing stick which is also used to control mouse cursors in laptops, a scroll wheel such as the wheels found on some mice, a keyboard, a joystick, a user-pressable button, or a touch panel or touch display. While the user input unit could be a device which is not physically connected to the data processing apparatus (such as a wireless mouse for example), the proximity cues for calibration may be strongest if the user input unit is directly connected to the data processing apparatus.

The wearable processing device may comprise any device which can be worn by a user on some part of the body. A particularly useful example is where the wearable processing device comprises a watch. However, other examples may include wearable jewellery with certain processing capabilities, such as a necklace, bracelet or ring. Also, the wearable processing device may be a smart pair of glasses which can provide augmented reality displays overlaid over the normal view of the user.

Viewed from another aspect, the present invention provides a data processing apparatus comprising:
processing circuitry configured to perform processing operations;
a user input unit configured to detect a user input operation comprising a physical interaction with the data processing apparatus for controlling the processing operations of the processing circuitry; and
wireless communication circuitry configured to receive wireless signals from a wearable processing device;
wherein the processing circuitry is configured to perform proximity detection for detecting proximity of the wearable processing device to the data processing apparatus based on the wireless signals received by the wireless communication circuitry from the wearable processing device; and
in response to the user input unit detecting the user input operation, the processing circuitry is configured to calibrate at least one detection parameter for the proximity detection.

Viewed from a further aspect, the present invention provides a data processing apparatus comprising:
processing means for performing processing operations;
user input means for detecting a user input operation comprising a physical interaction with the data processing apparatus for controlling the processing operations of the processing means; and
wireless communication means for receiving wireless signals from a wearable processing device;
wherein the processing means is configured to perform proximity detection for detecting proximity of the wearable processing device to the data processing apparatus based on the wireless signals received by the wireless communication means from the wearable processing device; and
in response to the user input means detecting the user input operation, the processing means is configured to calibrate at least one detection parameter for the proximity detection.

Viewed from a further aspect, the present invention provides a wearable processing device comprising:
processing circuitry configured to perform data processing; and
wireless communication circuitry configured to receive wireless signals from a data processing apparatus;
wherein the processing circuitry is configured to perform proximity detection for detecting proximity of the data processing apparatus to the wearable processing device based on the wireless signals received by the wireless communication circuitry from the data processing apparatus; and
in response to a calibration instruction received from the data processing apparatus indicating that a user input operation comprising a physical interaction with the data processing apparatus has been detected, the processing circuitry is configured to calibrate at least one detection parameter for the proximity detection.

Viewed from another aspect, the present invention provides a wearable processing device comprising:
processing means for performing data processing; and
wireless communication means for receiving wireless signals from a data processing apparatus;
wherein the processing means is configured to perform proximity detection for detecting proximity of the data processing apparatus to the wearable processing device based on the wireless signals received by the wireless communication means from the data processing apparatus; and
in response to a calibration instruction received from the data processing apparatus indicating that a user input operation comprising a physical interaction with the data processing apparatus has been detected, the processing means is configured to calibrate at least one detection parameter for the proximity detection.

BRIEF DESCRIPTION OF THE DRAWINGS

Further aspects, advantages and features of the present technique will be described below with reference to the accompanying drawings in which;

FIG. 2 schematically illustrates part of the data processing apparatus;

FIG. 3 schematically illustrates part of the wearable processing device;

FIG. 4 is a flow diagram illustrating a method of detecting proximity of the wearable processing device to the data processing apparatus;

FIG. 5 is a flow diagram illustrating detecting the wearable processing device moving out of proximity of the data processing apparatus;

FIG. 6 is a flow diagram illustrating a method of calibrating the proximity detection;

FIG. 7 shows some examples of calibrating a proximity detection threshold for the proximity detection;

DETAILED DESCRIPTION

Figure 1:
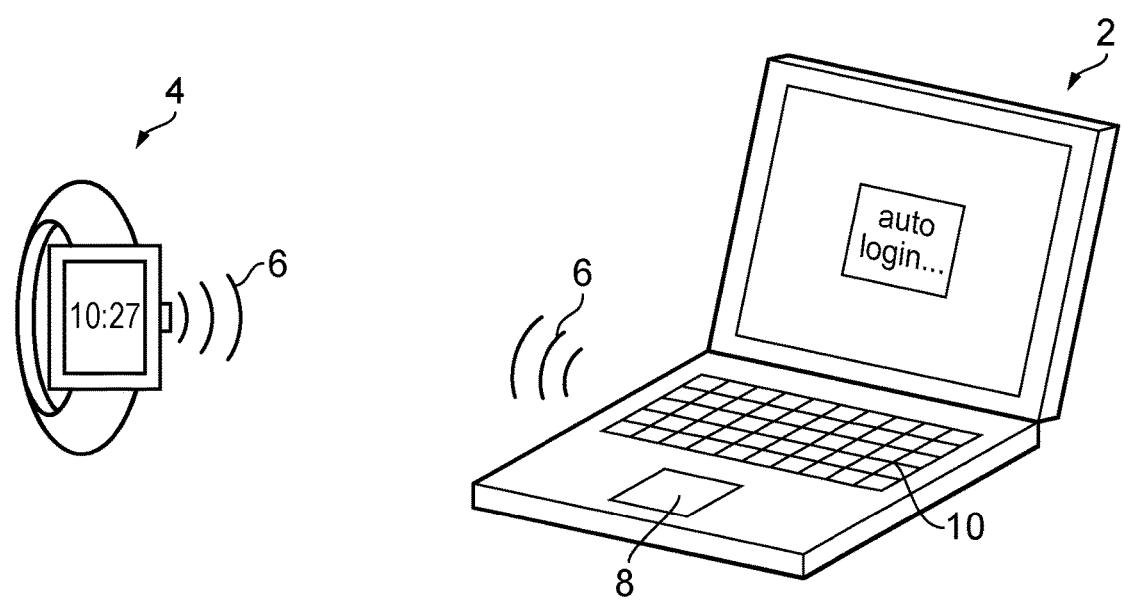
FIG. 1 schematically illustrates a wearable processing device and a data processing apparatus.

FIG. 1 schematically illustrates a data processing apparatus 2 and a wearable processing device 4. In this example the data processing apparatus 2 comprises a laptop and the wearable processing device 4 comprises a watch. Other examples of data processing apparatus include desktop computers, smart phones, or tablet computers, while other wearable processing devices may include bracelets, necklaces, rings, glasses and so on. The data processing apparatus 2 and wearable processing device 4 communicate via wireless signals 6. For example, the wireless communication may be via Bluetooth, wireless local area network communication (Wi-Fi), near field communication (NFC), radio frequency identification (RFID) signals, or some other kind of wireless communication.

The data processing apparatus has some user input units such as a track pad 8 and keyboard 10. The user can perform a user input operation using the user input units 8, 10 to control various operations of the data processing apparatus 2. The user input operation comprises a physical interaction with the data processing apparatus 2 or its peripherals. This means that when the user is performing a user input operation on one of the user input units 8, 10 then the user can be assumed to be in proximity to the data processing apparatus 2 and, given that the user will be wearing the wearable processing device 4, the wearable processing device can also be determined to be in proximity to the data processing apparatus 2. Therefore, when a user input operation is detected at one of the user input units 8, 10, then proximity detection based on the wireless signal 6 may be calibrated. This means that the user does not need to perform an explicit calibration operation and the user need not even be aware that the proximity detection is being calibrated. When proximity of the wearable processing device is detected, the data processing apparatus may perform a corresponding processing operation, such as automatically logging the user of the wearable processing device 4 into the data processing apparatus 2, a particular program or a website being accessed by the processing apparatus 2. The user of the wearable processing device 4 may previously have set up configuration information defining what actions should be taken when proximity of the wearable processing device 4 is detected.

FIG. 2 schematically illustrates an example of some of the elements comprised by the data processing apparatus 2. The data processing apparatus 2 comprises a processor 20 for processing data, a display 22, one or more user input units 8, 10 for accepting the user input operation and a wireless communication unit 24 for receiving wireless signal 6 from other devices and transmitting wireless signals. It will be appreciated that the data processing apparatus may have many other elements not illustrated in FIG. 2.

FIG. 3 similarly shows schematically some of the components of the wearable processing device. Again, the wearable processing device has a processor 30. Typically the processor 30 in the wearable processing device may have less processing resources than the processor 20 in a data processing apparatus 2. For example, the processor 30 may have a more limited set of functions and may be a slower processor than the processor 20. The wearable processing device also has user input units 32 such as a touch screen or user pressable button for accepting inputs from the user. The wearable processing device 4 comprises a wireless communication unit 34, a display 36 and a motion detector 38, which may comprise an accelerometer, magnetometer, gyroscope, or some other kind of motion detector such as a detector based on capturing images for example. Again, the wearable processing device 4 may comprise other elements that are not shown in FIG. 3.

FIG. 4 illustrates a method of detecting proximity of the wearable processing device 4 to the data processing apparatus 2. At step 40, the wireless communication unit 24 of the data processing apparatus 2 detects a proximity metric based on the wireless signals 6 received from the wearable processing device 4. For example, the proximity metric may be a received signal strength indicator (RSSI) or an indication of a time taken for a message to pass between the data processing apparatus 2 and the wearable processing device 4 (either in one direction for a one way trip time or in both directions for a round trip time). Any proximity metric which is dependent on the distance between the data processing apparatus and the wearable processing device may be used. At step 42 the data processing apparatus 2 detects whether the proximity metric measured at step 40 is greater or less than a proximity detection threshold, and based on this comparison, determines whether the wearable processing device 4 is in proximity to the data processing apparatus 2. For some proximity metrics the wearable processing device 4 may be detected to be in proximity if the proximity metric is greater than the threshold while for other metrics proximity may be detected if the proximity metric is less than the threshold. In some embodiments, the threshold may be selected from a group of thresholds or may be dynamically calculated based on current operating conditions of the apparatus 2.

If the wearable device 4 is determined not to be in proximity to the data processing apparatus 2, then the method returns to step 40 where the proximity metric continues to be monitored. If proximity is detected then the method proceeds to step 44 where a predetermined operation is performed, such as a user login operation or other authentication operation. It will be appreciated that the method of FIG. 4 need not always be performed by the data processing apparatus 2. The user may activate or deactivate the proximity detection function as desired.

FIG. 5 is a flow diagram showing a method of monitoring whether a wearable processing device 4 already detected to be in proximity is still in proximity to the data processing apparatus 2. At step 50, the device is determined to be in proximity, for example using the method of FIG. 4. At step 52 the data processing apparatus 2 continues to detect the proximity metric using the wireless communication unit 24 based on the wireless signals 6 received from the wearable processing device 4. At step 54 it is determined whether the proximity metric is within a predetermined amount of the proximity threshold or beyond the threshold so that the device is no longer considered in proximity. If not, then the method returns to step 52 where monitoring of the proximity metric continues and so the device 4 is still considered to be in proximity. If the proximity metric is within a predetermined amount of the threshold or beyond the threshold, then at step 56 a warning indication is generated. This may be a warning displayed on the display 36 of the wearable device 4 or the display 22 of the processing apparatus 2. The warning indication could also be an audible or vibrational indication such as using a buzzer on the wearable device 4. At step 58 it is determined whether a user input has been detected on one of the user input units 8, 10 of the data processing apparatus. In this case then it is assumed that the user is still present and so the method returns to step 52 and no user deauthentication or other operation associated with loss of proximity occurs. Alternatively, if the device is detected to return to proximity again within a given amount of time after the warning indication 56 has been generated then the method returns to 52. On the other hand, if no user input or return to proximity is detected within the predetermined amount of time, then at step 60 the predetermined operation which was being performed with the device based on proximity is halted. For example, the user may be logged out of a program, website or system. Steps 56 and 58 are optional, and in some other embodiments if the proximity metric is determined to be beyond the threshold or within a given amount of threshold then the method may proceed straight from step 54 to step 60 so that deauthentication of the user is performed right away. However, by generating a warning at step 56 the user is given some notice of the fact that they would soon lose proximity status, and can return to proximity or use the user input units 8, 10 to override this.

While FIGS. 4 and 5 show examples where a proximity metric detected based on the wireless signals is used to determine proximity of the wearable processing device 4 to the data processing apparatus 2, other parameters may also be considered. For example, the motion information captured by the motion detector 38 or a proximity detection metric captured by the wearable processing device 4 may also be used to improve confidence in proximity detection.

FIG. 6 shows a method of calibrating the proximity detection. At step 70, a user input operation is detected at one of the user input units 8, 10 of the data processing apparatus 2. When the user input operation is detected, then at step 72 the data processing apparatus 2 calibrates at least one detection parameter for the proximity detection process. For example, the detection parameter may be the proximity threshold shown in FIGS. 4 and 5.

FIG. 7 shows an example calibrating the proximity threshold. When the user input operation is detected at step 70, then a current value $P_{input}$ of the proximity metric at the time of the user input operation may be detected. The threshold may be set to a new value $th_{new}$ which is offset from the captured value of the proximity metric $P_{input}$ by a given offset value. The offset allows a safety band to be provided around the current value of the proximity metric. For example, the offset value may be dependent on the current value of the proximity threshold, the current (filtered or unfiltered) value of the proximity metric, and other parameters. An example of the calibration algorithm using filtering of the proximity metric may be provided as follows:

$$PF_n = (K*PF_{n-1}) + ((K-1)*P_{input})$$

$$\text{Offset} = f(PF_n, P_{input}, th_{current}, \text{other parameters} \ldots)$$

$$th_{new} = PF_n + \text{Offset}$$

where $PF_{n-1}$ is the previous filtered value of the proximity metric, $P_{input}$ is the current unfiltered value of the proximity metric measured at the time of the user input operation, $PF_n$ is the new filtered value of the proximity metric determined based on the previous filtered value and the current unfiltered value, K is a filtering constant, Offset is the offset, $th_{current}$ is the old value of the proximity threshold, $th_{new}$ is the new value of the proximity threshold, and f is any function of at least one of the new filtered value of the proximity metric, the current unfiltered value of the proximity metric, the old threshold value and any other parameter. The top half of FIG. 7 shows an example where the threshold was too high and so is reduced to be nearer the current value of the proximity metric. The bottom half of FIG. 7 shows an example where the threshold is increased. This results in better proximity detection as the boundary between proximity being detected and proximity not being detected will occur closer to the position of the wearable processing device 4 when the user input operation was detected.

In general, the calibration of FIGS. 6 and 7 may be performed for the particular wearable device 4 which has already been detected to be in proximity, and if necessary, for which authentication of the wearable device 4 has already been performed so that an attacker cannot force recalibration of the proximity detection. However, in some devices if the existing value of the proximity threshold is such that proximity can not be detected even when the wearable device 4 is close to the data processing apparatus 2 then the user may need to trigger a manual calibration of the threshold for a particular device, to set the threshold to a suitable level so that proximity can now be detected. Hence, calibration may also be performed independently of the user input operation if desired.

Figure 8:
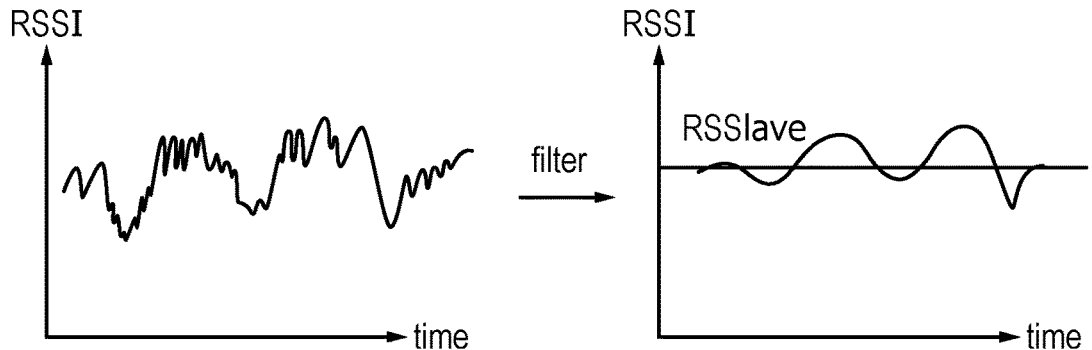
FIG. 8 illustrates an example of filtering out high frequency variation of a signal strength metric.
Figure 9:
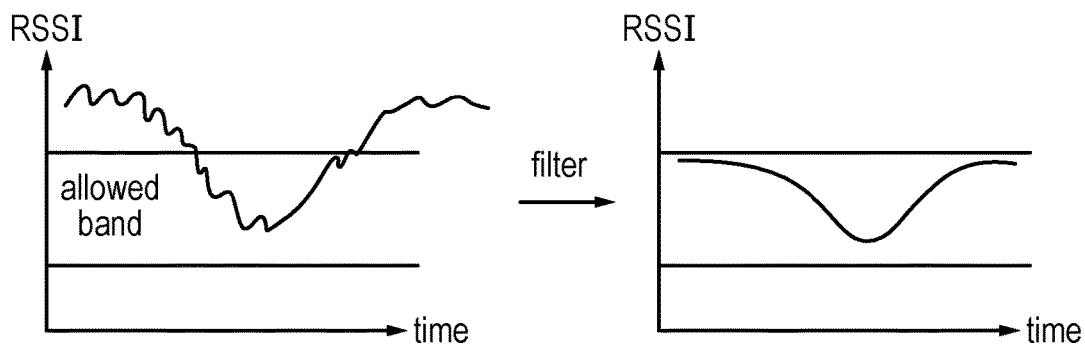
FIG. 9 shows an example of filtering out anomalous values of a signal strength metric.

Some proximity metrics such as a signal strength metric or RSSI may vary significantly over time even when the wearable processing device is relatively stationary. For example, movement of the user wearing the wearable processing device 4 may cause variation in the signal strength. Therefore, some filtering can be performed to reduce this variation to obtain a suitable proximity metric. As shown in FIG. 8, some filtering may be performed to filter out high frequency variation of the signal strength metric to smooth the variation. This can be done with a filter using a relatively long time constant. An average value $RSSI_{ave}$ of the signal strength metric may then be determined as shown in the right hand plot of FIG. 8 and this may be used as the proximity metric. Also as shown in FIG. 9, some values of the signal strength metric may be considered anomalous as they are outside an allowed band of signal strength values. The wireless communication unit 24 or the data processing apparatus 2 may filter out such anomalous values so that they are not considered for the purposes of proximity detection.

Figure 10:
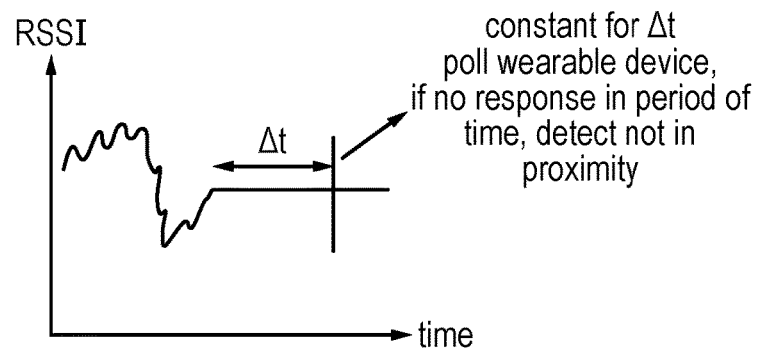
FIG. 10 illustrates an example of detecting lack of proximity of the wearable processing device if the signal strength metric remains constant for a given time period.

Also, certain wireless communication units 24 may continue to report constant signal strength values even when the source of wireless signals is removed. Some Bluetooth receivers for example do this. As shown in FIG. 10, if a constant signal strength metric is detected for greater than a certain minimum period of time □t then it may be assumed that the wearable device is no longer present and the constant values are due to the reporting function of the wireless unit. Hence, proximity may then be assumed to be lost. Alternatively, a message may be sent to poll the wearable device, and if no response is received in a given period of time then proximity may no longer be assumed. By checking for such constant values of the signal strength metric, the loss of proximity of the wearable processing device 4 can be detected earlier than would otherwise be the case, because otherwise one would have to wait until the wireless unit timed out after a given period of constant signal strength values.

Figure 11:
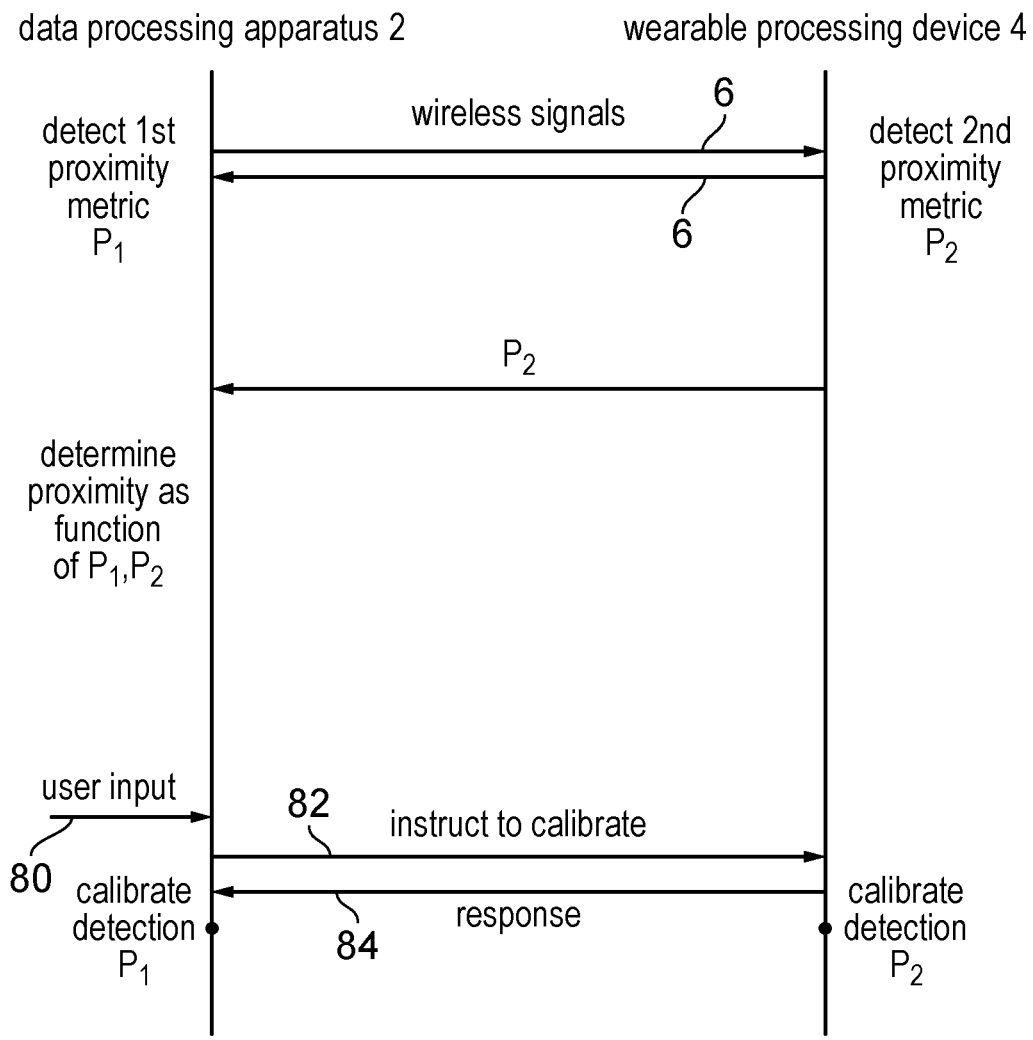
FIG. 11 shows an example of detecting proximity at both the data processing apparatus and the wearable processing device.

FIG. 11 shows another example of additional information which can be used to improve the accuracy of proximity detection. It is possible for the data processing apparatus 2 to detect the proximity solely based on the wireless signals 6 received from the wearable device 4. However, the wearable processing device 4 may also detect proximity of the data processing apparatus 2 based on wireless signals received from the data processing apparatus 2. As shown in FIG. 11, each of the devices 2, 4 may measure a corresponding proximity metric $P_1$, $P_2$. The wearable processing device 4 may transmit its proximity metric $P_2$ to the data processing apparatus 2 and then the data processing apparatus 2 can determine the proximity of the wearable processing device 4 as a function of both the proximity metrics $P_1$, $P_2$. In general, if there is confidence that both devices have detected proximity of the other device then proximity as a whole may be determined with a high degree of confidence, while if only one of the devices is detecting proximity of the other then the degree of confidence in proximity detection may be lower. The data processing apparatus 2 may require the overall confidence value to be higher than a given amount in order to detect proximity.

FIG. 11 also shows a technique for calibrating the proximity detection of the wearable processing device 4. When the user input operation 80 is detected by the data processing apparatus 2, then the data processing apparatus 2 may respond by calibrating its proximity detection based on a measured first proximity metric $P_1$. The data processing apparatus 2 may also send a calibration instruction 82 to the wearable processing device 4 to trigger the wearable processing device 4 to calibrate its detection based on a measured second proximity metric $P_2$. Hence, both devices may calibrate their proximity detection when the user input 80 is detected, as this provides a reliable proximity cue to indicate that the wearable processing device 4 should be considered to be in proximity to the data processing apparatus 2. The calibration instruction 82 may trigger a response 84 from the wearable processing device 4 so that the data processing apparatus 2 is guaranteed to receive some wireless signals from the wearable processing device 4 which it can use for calibration.

Figure 12:
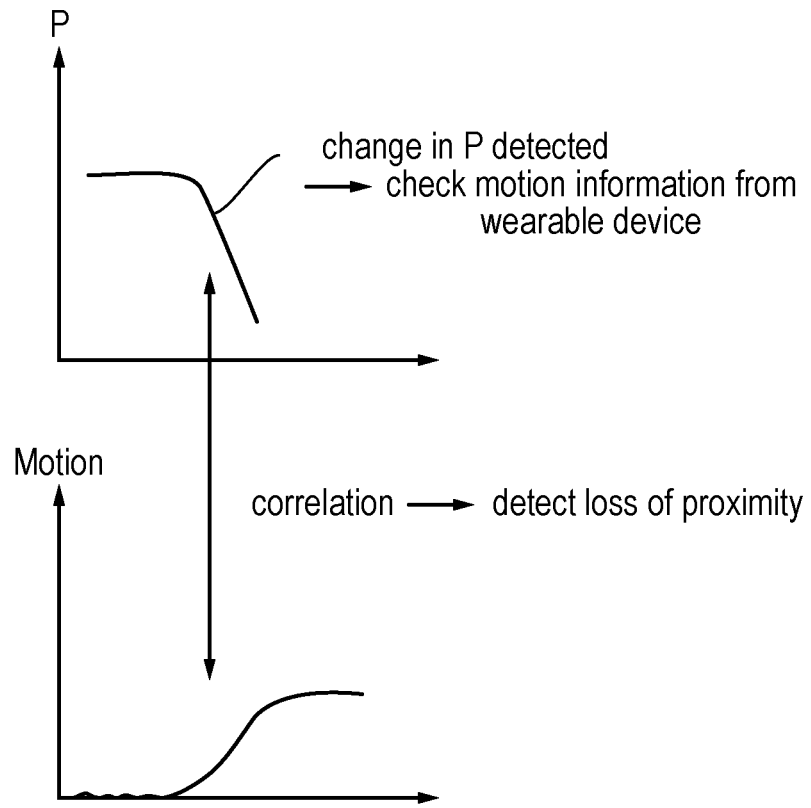
FIG. 12 illustrates an example of considering motion information when detecting proximity.

FIG. 12 shows another example, in which motion information captured by the motion detector 38 is used to increase confidence in proximity detection. When a change in proximity is detected based on the proximity metric determined from the wireless signals, then this may be verified by checking whether the motion information indicates motion of the wearable processing device 4. If motion is detected, then this correlates with the change in proximity and so the proximity status may then be determined with a higher degree of confidence then if the motion information is not showing any motion. For example, as shown in FIG. 12, when a change in the proximity metric is detected to indicate that the wearable device 4 should be moving further away from the data processing apparatus 2 (in this example a decrease in the proximity metric), then the data processing apparatus 2 may check the motion information received from the wearable processing device 4 and may then correlate the change in the proximity metric with the change in motion information. If a sufficiently high degree of correlation is detected, then the loss of proximity may be confirmed.

Figure 13:
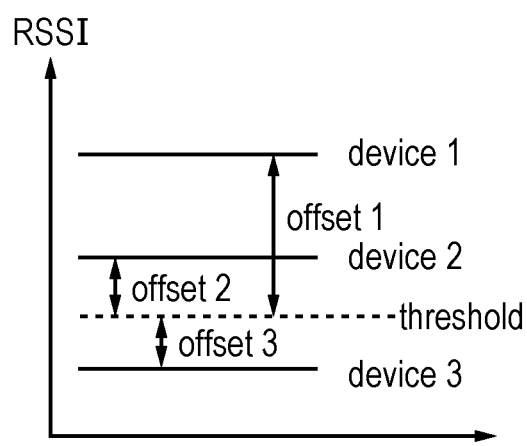
FIG. 13 illustrates an example of considering signal strength transmission or reception offsets in the proximity detection.

FIG. 13 shows another example of calibration of the proximity detection. Different variable processing devices 1, 2, 3 may have different wireless transmission strengths and so even when the devices are at the same distance from the data processing apparatus 2, different signal strengths may be detected. To allow the different devices to share a common threshold, it can be useful to determine a transmission offset for each device which offsets the threshold used for that device when detecting proximity. The offset may be measured by the data processing apparatus 2 itself when the wearable processing devices 4 are at a fixed distance away from the wireless receiver. For example, the data processing apparatus 2 could direct the user to place the device 4 a given distance away from the apparatus 2. On the other hand, a more reliable indication of the transmission offset may be achieved by measuring the offset in controlled conditions in the factory when the wearable devices 4 are manufactured, and then storing an indication of the offset in a storage region of each device 4. In this case, then the data processing apparatus 2 may simply read the stored offset from the wearable processing device 4 to determine the offset. Similarly, an offset may be applied for accounting for differences in the reception strength of the wireless receiver in the wireless communication unit 24 of the data processing apparatus 2 and the threshold can be offset by this amount when detecting proximity.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. A method comprising steps of:
    detecting proximity of a wearable processing device to a data processing apparatus based on whether a proximity metric determined based on wireless signals received by the data processing apparatus from the wearable processing device exceeds a proximity detection threshold;
    detecting a user input operation comprising a physical interaction with the data processing apparatus for controlling the data processing apparatus; and
    in response to detecting the user input operation, calibrating the proximity detection threshold for the proximity detecting step by adjusting the proximity detection threshold to a value closer to a current value of the proximity metric than a previous value of the proximity detection threshold.

2. The method according to claim 1, comprising the data processing apparatus performing at least one predetermined operation in response to detecting proximity of the wearable processing device to the data processing apparatus.

3. The method according to claim 1, comprising performing user authentication in response to detecting proximity of the wearable processing device.

4. The method according to claim 3, wherein different values for the proximity detection threshold are associated with different wearable processing devices; and
    in response to detecting the user input operation, the calibrating step calibrates the proximity detection threshold associated with a wearable processing device whose user is currently authenticated.

5. The method according to claim 3, comprising performing user deauthentication in response to detecting that the wearable processing device is no longer in proximity to the data processing apparatus.

6. The method according to claim 5, comprising deferring or inhibiting the user deauthentication if said user input operation is detected.

7. The method according to claim 1, comprising generating a deauthentication warning indication with at least one of the data processing apparatus and the wearable processing device in response to detecting that the wearable processing device is no longer in proximity to the data processing apparatus.

8. The method according to claim 7, comprising performing user deauthentication if the wearable processing device is detected to still not be in proximity to the data processing apparatus when a predetermined amount of time has elapsed after generating the deauthentication warning indication.

9. The method according to claim 1, comprising the wearable processing device detecting proximity of the data processing apparatus to the wearable processing device based on wireless signals received by the wearable processing device from the data processing apparatus.

10. The method according to claim 9, wherein the proximity detecting step detects proximity of the wearable processing device based on a first proximity metric determined based on the wireless signals received by the data processing apparatus from the wearable processing device and a second proximity metric determined based on the wireless signals received by the wearable processing device from the data processing apparatus.

11. The method according to claim 9, wherein in response to detecting the user input operation, the data processing apparatus instructs the wearable processing device to perform calibration of at least one detection parameter for detecting the proximity of the data processing apparatus to the wearable processing device.

12. The method according to claim 1, comprising:
a step of determining a transmission power offset of the wearable processing device, the transmission power offset being indicative of the signal strength of the wireless signals received from the wearable processing device when the wearable processing device is a predetermined distance away from wireless communication circuitry for receiving the wireless signals; and
a step of calibrating the proximity detection threshold or a further detection parameter for the proximity detecting step based on the transmission power offset.

13. The method according to claim 1, wherein the user input operation comprises physical interaction with a user input unit comprising at least one of:
a touchpad;
a mouse;
a pointing stick;
a scroll wheel;
a keyboard;
a joystick;
a user-pressable button; and
a touch panel or touch display.

14. The method according to claim 1, wherein the user input operation comprises physical interaction with a user input unit that is directly connected with the data processing apparatus.

15. A data processing apparatus comprising:
processing circuitry configured to perform processing operations;
a user input interface configured to detect a user input operation comprising a physical interaction with the data processing apparatus for controlling the processing operations of the processing circuitry; and
wireless communication circuitry configured to receive wireless signals from a wearable processing device;
wherein the processing circuitry is configured to perform proximity detection for detecting proximity of the wearable processing device to the data processing apparatus based on whether a proximity metric determined based on the wireless signals received by the wireless communication circuitry from the wearable processing device exceeds a proximity detection threshold; and
in response to the user input interface detecting the user input operation, the processing circuitry is configured to calibrate the proximity detection threshold for the proximity detection by adjusting the proximity detection threshold to a value closer to a current value of the proximity metric than a previous value of the proximity detection threshold.

16. A wearable processing device comprising:
processing circuitry configured to perform data processing; and
wireless communication circuitry configured to receive wireless signals from a data processing apparatus;
wherein the processing circuitry is configured to perform proximity detection for detecting proximity of the data processing apparatus to the wearable processing device based on whether a proximity metric determined based on the wireless signals received by the wireless communication circuitry from the data processing apparatus exceeds a proximity detection threshold; and
in response to a calibration instruction received from the data processing apparatus indicating that a user input operation comprising a physical interaction with the data processing apparatus has been detected, the processing circuitry is configured to calibrate the proximity detection threshold by adjusting the proximity detection threshold to a value closer to a current value of the proximity metric than a previous value of the proximity detection threshold.

* * * * *